United States Patent
Kim et al.

(10) Patent No.: US 11,156,969 B1
(45) Date of Patent: Oct. 26, 2021

(54) ENVIRONMENT FACTOR CONTROL DEVICE AND TRAINING METHOD THEREOF

(71) Applicant: MakinaRocks Co., Ltd., Seoul (KR)

(72) Inventors: Byungchan Kim, Seoul (KR); Jongsun Shinn, Seoul (KR); Sangwoo Shim, Sokcho-si (KR); Sungho Yoon, Seoul (KR)

(73) Assignee: MAKINAROCKS CO., LTD., Seoul (KR)

( * ) Notice: Subject to any disclaimer, the term of this patent is extended or adjusted under 35 U.S.C. 154(b) by 0 days.

(21) Appl. No.: 17/238,105

(22) Filed: Apr. 22, 2021

Related U.S. Application Data (63) Continuation of application No. PCT/KR2021/001512, filed on Feb. 5, 2021.

(30) Foreign Application Priority Data

Apr. 24, 2020 (KR) .................. 10-2020-0049902

(51) Int. Cl.
  *G05B 13/02* (2006.01)
  *G06K 9/62* (2006.01)
  *G05B 13/04* (2006.01)

(52) U.S. Cl.
  CPC ......... *G05B 13/0265* (2013.01); *G05B 13/04* (2013.01); *G06K 9/6256* (2013.01)

(58) Field of Classification Search
  CPC ... G05B 13/04; G05B 13/0265; G06K 9/6256
  See application file for complete search history.

(56) References Cited

U.S. PATENT DOCUMENTS

| | | | | |
|---|---|---|---|---|
| 4,650,453 A | * | 3/1987 | Blidung | B26D 1/62 493/239 |
| 5,325,042 A | * | 6/1994 | Murugan | F02N 11/04 322/10 |
| 9,692,297 B2 | * | 6/2017 | Archibald | G06F 1/26 |
| 2004/0177155 A1 | * | 9/2004 | Enokida | G06T 9/007 709/236 |
| 2012/0054131 A1 | | 3/2012 | Williamson | |
| 2016/0283922 A1 | * | 9/2016 | Jinno | G06Q 20/105 |
| 2019/0228291 A1 | | 7/2019 | Kurasawa et al. | |
| 2019/0250203 A1 | | 8/2019 | Ali et al. | |

(Continued)

FOREIGN PATENT DOCUMENTS

JP 6574527 B2 9/2019
KR 10-2009-0078501 A 7/2009

(Continued)

*Primary Examiner* — Ronald D Hartman, Jr.
(74) *Attorney, Agent, or Firm* — Seed IP Law Group LLP (57) ABSTRACT

Disclosed is a non-transitory computer readable medium storing a computer program, wherein the computer program includes instructions to perform following steps for data processing when the computer program is executed by one or more processors, the steps including: recognizing at least one continuous section from each raw data subset; determining at least one serialization point, based on a start point and an end point of each of the at least one continuous section for each of the raw data subset; and generating a training data set by generating serialized training data, based on the at least one serialization point.

14 Claims, 6 Drawing Sheets

(56) References Cited

U.S. PATENT DOCUMENTS

2019/0377984 A1   12/2019  Ghanta et al.
2020/0201570 A1*  6/2020  Kim ........................ G06F 12/10
2021/0160273 A1*  5/2021  Choi ................... H04L 63/1433

FOREIGN PATENT DOCUMENTS

| | | |
|---|---|---|
| KR | 10-1129723 B1 | 5/2012 |
| KR | 10-1864286 B1 | 7/2018 |
| KR | 10-2019-0134308 A | 12/2019 |

* cited by examiner

ENVIRONMENT FACTOR CONTROL DEVICE AND TRAINING METHOD THEREOF

CROSS-REFERENCE TO RELATED APPLICATION

This application is a continuation of International Application No. PCT/KR2021/001512, filed Feb. 5, 2021, which claims priority to and the benefit of Korean Patent Application No. 10-2020-0049902 filed in the Korean Intellectual Property Office on Apr. 24, 2020, the entire contents of which applications are incorporated herein by reference.

BACKGROUND

Technical Field

The present disclosure relates to an apparatus for controlling an environmental factor by using a computer device, and a training method thereof, and more particularly, to a method of transforming training data having a discontinuous form to a continuous form.

Description of the Related Art

In general, in an apparatus, such as a microorganism cultivation apparatus, requiring 24-hour monitoring and environmental factor control, remote control has been performed by a human operator in the related art.

The control method in the related art has an advantage of being performed based on the expertise of the human operator in the field, but has a disadvantage in that real-time control of the corresponding device is impossible.

Accordingly, there are demands in the art for an apparatus capable of appropriately controlling an environmental factor in real time based on an operation pattern of a human operator and a control method using the apparatus.

Prior art literatures of the present disclosure are as follows.

(Patent Document 1) Korean Patent No. 10-1129723
(Patent Document 2) US Patent Application Publication No. 2012/0054131
(Patent Document 3) US Patent Application Publication No. 2019/0250203

BRIEF SUMMARY

The present disclosure is conceived to respond to the foregoing background art, and provides a method of training an environmental factor control automation model.

The technical benefits of the present disclosure are not limited to the foregoing technical benefits, and other non-mentioned technical benefits will be clearly understood by those skilled in the art from the description below.

According to an embodiment of the present disclosure for solving the foregoing problems, a non-transitory computer readable medium storing a computer program is disclosed. The computer program includes instructions to perform following steps for data processing when the computer program is executed by one or more processors, the steps including: recognizing at least one continuous section from each raw data subset; determining at least one serialization point, based on a start point and an end point of each of the at least one continuous section for each of the raw data subset; and generating training data by generating serialized training data, based on the at least one serialization point.

The raw data subset may be in a form of a step function.

The serialization point may be determined based on a start point and an end point of the continuous section and a predetermined ratio of length of the continuous section.

The predetermined ratio may differ depending on a type of the raw data.

The serialization point may exceed two within the continuous section.

The serialization point may be determined based on a start point and an end point of two or more subsections for each of the two or more subsections separating the continuous section.

Each of the two or more subsections may be different in length.

The generating of serialized training data may be comprised of: determining a plurality of points connecting the at least one serialization point through an interpolation method.

The plurality of points may be determined by interpolating with a linear functional or a multi-order function.

The interpolation method may be at least one of a linear interpolation or a spline interpolation.

The non-transitory computer readable medium may further include: training an environmental factor control automation model by using the training data set; evaluating performance of the environmental factor control automation model; and determining whether to generate a new training data set by resetting the serialization point, based on a result of performance evaluating.

The performance may be measured based on Mean Square Error (MSE) of Validation data set.

According to another embodiment of the present disclosure for solving the foregoing problems, an apparatus for environmental factor control automation is disclosed. The apparatus for environmental factor control automation includes: a memory; and a processor, in which the processor is configured to: recognize at least one continuous section from each raw data subset; determine at least one serialization point, based on a start point and an end point of each of the at least one continuous section for each of the raw data subset; and generate training data by generating serialized training data, based on the at least one serialization point.

According to still another embodiment of the present disclosure for solving the foregoing problems, a non-transitory computer-readable medium storing data structure is disclosed. The non-transitory computer-readable medium storing data structure is a non-transitory computer-readable medium storing data structure corresponding to a parameter of neural network where at least a part is updated during a training process, wherein an operation of the neural network is based on at least a part of the parameter, the training process including: recognizing at least one continuous section from each raw data subset; determining at least one serialization point, based on a start point and an end point of each of the at least one continuous section for each of the raw data subset; and generating a training data set by generating serialized training data, based on the at least one serialization point.

The present disclosure may provide a method of training an environmental factor control apparatus automation model.

DETAILED DESCRIPTION

Various embodiments are described with reference to the drawings. In the present specification, various descriptions are presented for understanding the present disclosure. However, it is obvious that the embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. However, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A," "the case including only B," and "the case where A and B are combined."

Those skilled in the art shall recognize that the various illustrative logical blocks, configurations, modules, circuits, means, logic, and algorithm operations described in relation to the embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Therefore, the present disclosure is not limited to the embodiments presented herein. The present disclosure shall be interpreted within the broadest meaning range consistent to the principles and new characteristics presented herein.

Figure 1:
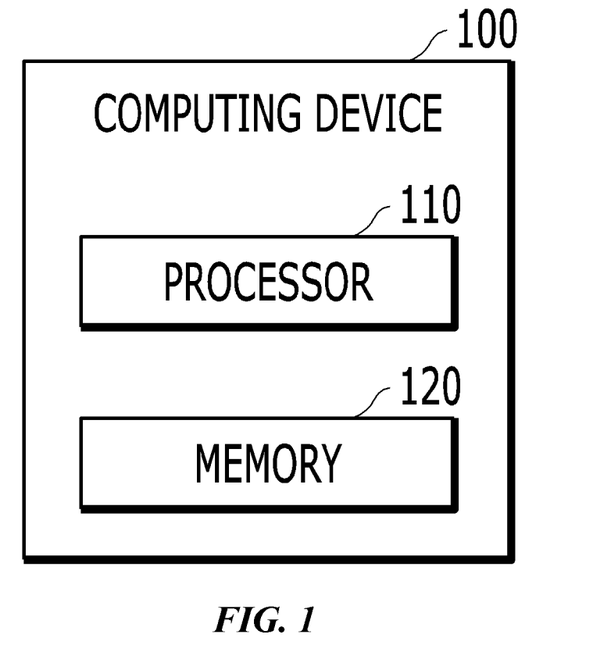
FIG. 1 is a block diagram illustrating a computing device for performing an environmental factor control automation method according to an embodiment of the present disclosure.

FIG. 1 is a block diagram illustrating an example of a computing device for performing an environmental factor control automation method according to the present disclosure.

The configuration of a computing device 100 illustrated in FIG. 1 is merely a simplified example. In the embodiment of the present disclosure, the computing device 100 may include other configurations for performing a computing environment of the computing device 100, and only some of the disclosed configurations may also configure the computing device 100.

The computing device 100 may include a processor 110 and a memory 120.

The processor 110 may be formed of one or more cores, and may include a processor, such as a central processing unit (CPU), a general-purpose graphics processing unit (GPGPU), and a tensor processing unit (TPU) of the computing device, for performing a data analysis and deep learning. The processor 110 may read a computer program stored in the memory 120 and process data for machine learning according to an embodiment of the present disclosure. According to the embodiment of the present disclosure, the processor 110 may perform computation for training a neural network. The processor 110 may perform a calculation, such as processing of input data for training in Deep Learning (DN), extraction of a feature from input data, an error calculation, and updating of a weight of the neural network by using backpropagation, for training the neural network. At least one of the CPU, GPGPU, and TPU of the processor 110 may process training of a network function.

For example, the CPU and the GPGPU may process training of the network function and data classification by using a network function together. Further, in the embodiment of the present disclosure, the training of the network function and the data classification by using a network function may be processed by using the processors of the plurality of computing devices together. Further, the computer program executed in the computing device according to the embodiment of the present disclosure may be a CPU, GPGPU, or TPU executable program.

According to the embodiment of the present disclosure, the memory 120 may store a predetermined type of information generated or determined by the processor 110 and a predetermined type of information received by a network unit.

According to the embodiment of the present disclosure, the memory 120 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

Figure 2:
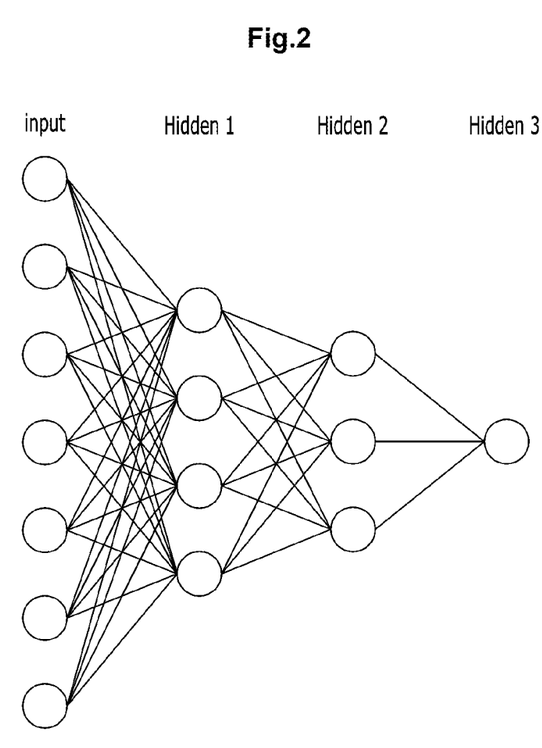
FIG. 2 is a schematic diagram illustrating a network function for performing the environmental factor control automation method according to an embodiment of the present disclosure.

FIG. 2 is a schematic diagram illustrating a network function for performing the environmental factor control automation method according to an embodiment of the present disclosure.

Throughout the present specification, a computation model, a nerve network, the network function, and the neural network may be used with the same meaning. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links and a correlation between the nodes and the links in the neural network, and a value of the weight assigned to each of the links. For example, when there are two neural networks in which the numbers of nodes and links are the same and the weights between the links are different, the two neural networks may be recognized to be different from each other.

The neural network may consist of one or more nodes. Some of the nodes configuring the neural network may form one layer based on distances from an initial input node. For example, a set of nodes having a distance of n from an initial input node may form n layers. The distance from the initial input node may be defined by the minimum number of links, which, in some embodiments, need to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the final input node may mean one or more nodes that do not include output nodes in a relationship with other nodes in the nodes in the neural network. Otherwise, the initial input node may mean nodes which are not included in other input nodes connected through the links in a relationship between the nodes based on the link in the neural network. Further, the hidden node may mean nodes configuring the neural network, not the initial input node and the final output node. In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize the latent structures of pictures, texts, videos, voices, and music (for example, an object included in the picture, the contents and the emotion of the text, and the contents and the emotion of the voice). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, Siamese network, and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). In this case, in the example of FIG. 2, it is illustrated that the dimension reduction layer and the dimension restoration layer are symmetrical, but the present disclosure is not limited thereto, and the nodes of the dimension reduction layer and the dimension restoration layer may be symmetrical and may be asymmetrical. The auto encoder may perform a nonlinear dimension reduction. The number of input layers and the number of output layers may correspond to the number of sensors left after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be learned by at least one scheme of supervised learning, unsupervised learning, and semi-supervised learning. The learning of the neural network is for the purpose of reducing or minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A variation rate of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of omitting a part of nodes of the network during the learning process, and the like may be applied.

Figure 3:
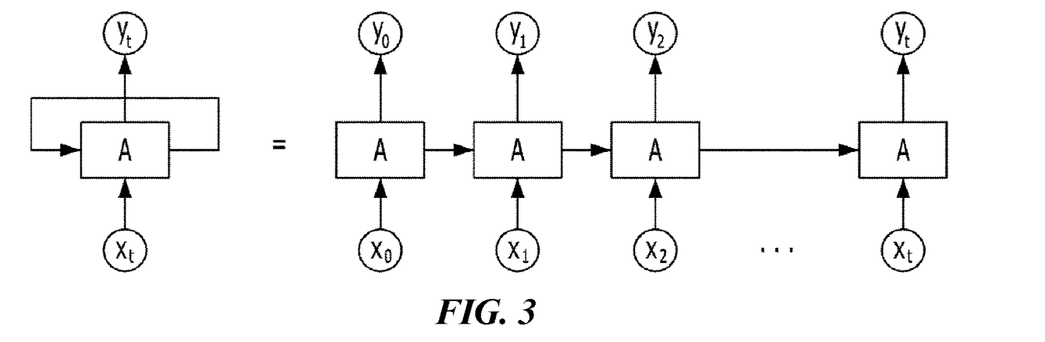
FIG. 3 is a diagram illustrating an example of a recurrent neural network that is one form of a network function according to the present disclosure.

FIG. 3 is a diagram illustrating an example of a recurrent neural network that is a form of an artificial neural network according to the present disclosure.

As illustrated in FIG. 3, in the present disclosure, the network function may have a form of a Recurrent Neural Network (RNN), as well as a form of a general artificial neural network. The RNN has a characteristic in which a connection between units has a recurrent structure. The structure makes it possible to store a state inside a neural network so that time-varying dynamic feature may be modeled. Unlike a feedforward neural network, the RNN may process a sequence type of input by using an internal memory. Accordingly, the RNN may process data having a time-varying feature, such as handwriting recognition and speech recognition. The foregoing description of the data is merely an example, and the present disclosure is not limited thereto.

Input data according to the present disclosure is the data input to the neural network, and particularly, when the neural network is the RNN, the input data may be the data for an environmental factor.

Output data according to the present disclosure is a result of input data derived through a network function, and may be a value of an environmental factor derived by the network function at a current time point.

For example, when the method of controlling the environmental factor according to the present disclosure relates to a microorganism cultivation apparatus, input data X may include temperature, humidity, oxygen concentration, and the like at the time point. Further, for example, when the method of controlling the environmental factor according to the present disclosure relates to a microorganism cultivation apparatus, output data Y may include rotations per minute (RPM), airflow, and the like of the microorganism cultivation apparatus at the current time point, which are derived by the neural network.

However, the input data and the output data are merely examples, and the types of the input data and the output data are not limited thereto.

In the method of controlling the environmental factor according to the present disclosure, for the constructed data, the RNN may be trained to derive the value of the environmental factor according to time.

The RNN is generally suitable for modelling sequence/time-series data. Accordingly, the output data Y may be related to the environment factor that is an object to be controlled according to time. This is merely an example of the form of the sequence/time-series data, and the type of the sequence/time-series data is not limited thereto.

The foregoing content is merely the example of the forms of the input data and the output data, so that the input data and the output data are not limited to the foregoing example.

Figure 4:
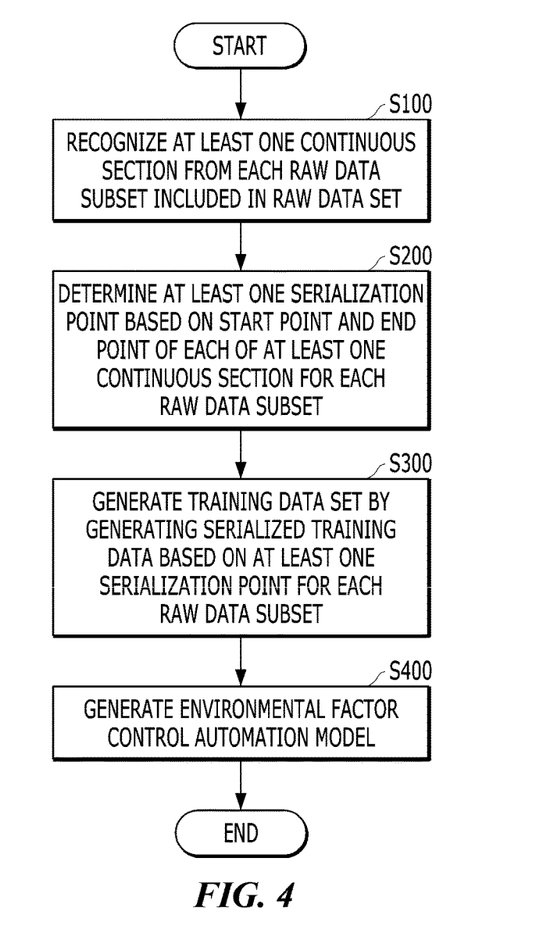
FIG. 4 is a flowchart illustrating an example of a method of generating, by a processor, an environmental factor control automation model according to the present disclosure.

FIG. 4 is a flowchart illustrating an example of a method of generating, by a processor, an environmental factor control automation model according to the present disclosure.

In the present disclosure, the environment may mean an environment in experiments, processes, storage, and the like that are continuously performed for a certain period of time. That is, in the example, the environment may be a laboratory in which an experiment is conducted, a medium, a sealed space, a freezer that stores arbitrary items, and a furnace in a steel mill, and the like.

In this case, the environmental factor that is the target to be controlled in the apparatus and the method according to the present disclosure may be an RPM of an experimental device, airflow in an experimental medium controlled based on temperature, humidity, and the like of an experimental space.

The kind of the environmental factor is merely an example for helping understanding of the object to be controlled of the apparatus and the method according to the present disclosure, so that the type of the factor to be controlled should not be limited thereto.

Referring to FIG. 4, the processor 110 may recognize at least one continuous section from each raw data subset included in a raw data set (S100).

The raw data subset according to the present disclosure may be a set of raw data which is a vector having an environmental factor and time as elements.

Particularly, the raw data subset may be sequence data according to time of the environmental factor.

For example, the environmental factor control automation model according to the present disclosure may be an apparatus and a method of controlling an RPM and airflow of an experimental device in a microorganism cultivation process. In this case, the raw data subset may be a set including vectors representing an RPM according to time of the plurality of cultivation apparatuses.

For example, the raw data subset may consist of {(2000 rpm, 1 second), (2000 rpm, 2 seconds), (2200 rpm, 3 seconds), . . . }.

The raw data according to the present disclosure may be past data that has performed a control operation on the environmental factor that is the object to be controlled. For example, the raw data may be data collected from records on environmental factors. The control operation progresses at a predetermined time interval, and a value of the control factor is uniform between the control operations. As described above, when the raw data subset is expressed in the form of a graph on a coordinate space, the data included in the data subset may show a discontinuous form, such as a step function, in the coordinate space.

According to the environmental factor control automation method according to the present disclosure, training data, such as the raw data subset, for the neural network, may be serialized. In the case where the neural networks reflecting time-series information are trained by using the discontinuous data according to the general technology, the neural network may not be smoothly trained. However, when the serialized training data is used like the method according to the present disclosure, the neural network may be more effectively trained.

The model trained with the continuous data may control the environmental factor according to a change in a surrounding environment in real time. Accordingly, it is possible to solve the problem in the related art in that it is difficult to an operation manager of the experimental device to immediately respond to changes in the environment in the culture process, production process, and the like. That is, even though the environment appears to be a static state at a glance, since minute changes are continuously made within the corresponding environment, the method of controlling the environmental factor according to the present disclosure may ensure the optimum control.

When the operation record is serialized and the neural network is trained with the serialized operation record by the environmental factor control automation model according to the present disclosure, it is possible to respond to the minute change in the environment to be controlled in real time while reflecting the existing environmental factor control method. Accordingly, goals, such as efficiency of microorganism cultivation process or production process, may be achieved.

For the convenience of description, it was described that the raw data is the two-dimensional vector having the value of one environmental factor and the time as the elements. However, the raw data is not limited thereto, and the raw data may be the vector having two or more types of environmental factors and the time as the elements. For example, the raw data may consist of two or more environmental factors and the time, such as RPM, airflow, . . . , and time).

Accordingly, each of the raw data included in the raw data subset may express the states of the various environmental factors according to time, so that the raw data and the raw data subset should not be limited to and interpreted based on the foregoing example.

In the present disclosure, the plurality of data is "continuous" means that when the plurality of data is arranged in a coordinate space, points corresponding to the plurality of data are connected in the space without being disconnected.

Accordingly, when the raw data presented in one continuous section are arranged in the coordinate space, the raw data may be connected in the space without the disconnection of all of the points.

The continuous section according to the present disclosure may mean a set of points in which each of the raw data is continuously expressed when the raw data subset is expressed as a graph.

As an example of the raw data according to the present disclosure, the raw data may have the form of a step function. In this case, when each of the raw data included in the raw data subset is expressed in the coordinate space, the raw data subset may have the form of the step function having a plurality of continuous sections. Further, when the plurality of continuous sections is included in the raw data subset, each of the continuous section may be discontinuous with respect to each other.

Accordingly, the processor 110 according to the present disclosure may determine at least one continuous section for each raw data subset.

The processor 110 may determine a start point and an end point of the continuous section.

In the present disclosure, the start point and the end point may be defined for each of the continuous sections. That is, the start point and the end point may mean determined points at which the continuous section starts and ends by a predetermined rule. The predetermined rule for determining the start point and the end point will be described below.

For example, for each of the continuous sections included in the raw data subset, the processor 110 may determine a point closest to the origin among the points corresponding to the raw data included in the continuous section as the start point and the point farthest from the origin as the end point. Otherwise, when the raw data includes time as one element, the processor 110 may determine the point having the smallest time value as the start point and the point having the largest time value as the end point for each continuous section.

The method of determining the start point and the end point is merely an example, and the method of determining the start point and the end point is not limited thereto.

The processor 110 may determine at least one serialization point based on the start point and the end point of each of at least one continuous section for each of the raw data subsets (S200).

The processor 110 according to the present disclosure may determine a serialization point in order to connect the plurality of continuous sections when the raw data subset includes the plurality of continuous sections.

For example, the processor 110 may determine a point spaced apart from the start point of the continuous section by a predetermined distance as a serialization point for the start point, and a point spaced apart from the end point of the continuous section by a predetermined distance as a second serialization point.

Hereinafter, an example of the method of determining the serialization point will be described.

In particular, the processor 110 may calculate a distance by a predetermined ratio for a length of the continuous section. The predetermined ratio may be different depending on the environment to which the environment factor control method and apparatus according to the present disclosure are applied, and the type of environmental factor. In one raw data, a different ratio may be applied to the different kind of environment factor.

The processor 110 may determine the serialization point based on the distance by the predetermined ratio from the start point and the end point of the continuous section for each of the plurality of continuous sections, and connect the plurality of serialization sections to generate serialized training data.

When the serialization point is determined, the processor 110 may make the serialization point to be spaced apart from the start point and the end point by the distance by the predetermined ratio with respect to each axis direction in the coordinate space. The method of determining the serialization point will be described in detail with reference to FIG. 5.

According to the environmental factor control automation method according to the present disclosure, training data, such as the raw data subset, for the neural network, may be serialized. In the case where the neural networks reflecting time-series information are trained by using the discontinuous data according to the general technology, the neural network may not be smoothly trained. In the meantime, when the serialized training data is used like the method according to the present disclosure, the neural network may be more effectively trained.

The model trained with the continuous data may control the environmental factor according to a change in a surrounding environment in real time. Accordingly, it is possible to solve the problem in the related art in that it is difficult for an operation manager of the experimental device to immediately respond to changes in the environment in the culture process, production process, and the like. That is, even though the environment appears to be a static state at a glance, since minute changes are continuously made within the corresponding environment, the method of controlling the environmental factor according to the present disclosure may ensure the optimum control.

When the operation record is serialized and the neural network is trained with the serialized operation record by the environmental factor control automation model according to the present disclosure, it is possible to respond to the minute change in the environment to be controlled in real time while reflecting the existing environmental factor control method. Accordingly, goals, such as efficiency of microorganism cultivation process or production process, may be achieved.

The processor 110 may generate serialized training data based on at least one serialization point for each of the raw data subsets (S300).

The processor 110 may generate serialized training data by connecting the plurality of serialization points determined in operation S200.

Herein, the connection of the plurality of serialization points may mean the generation of the plurality of points, which connects two serialization points, in the coordinate space by applying an interpolation method to a space between the two serialization points.

The interpolation method will be described below in detail with reference to FIG. 6A and FIG. 6B.

The connection of the two serialization points through the interpolation method is merely an example of the method of generating the serialized training data, and the method of generating the serialized training data is not limited thereto.

The processor 110 may generate an environmental factor control automation model by using the generated serialized training data (S400).

The processor 110 may generate the serialized training data for each of the raw data subsets. Accordingly, the plurality of serialized training data may be generated for each of the raw data sets.

The processor 110 may generate the environmental factor control automation model by training the environmental factor control automation model by using the generated serialized training data.

This will be described in detail with reference to FIG. 7.

Figure 5:
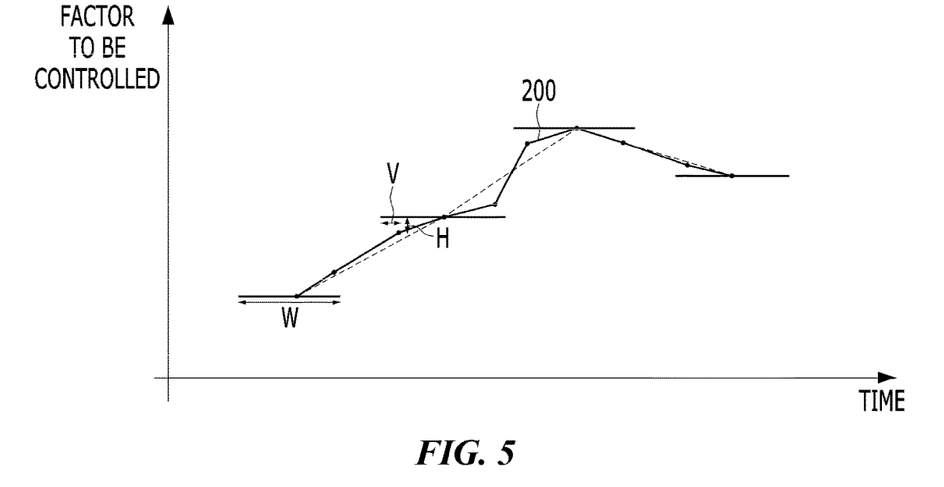
FIG. 5 is a diagram illustrating an example of a determination of a serialization point by the processor according to the present disclosure.

FIG. 5 is a diagram illustrating an example of the determination of the serialization point by the processor according to the present disclosure.

The continuous section according to the present disclosure may mean a set of points in which each of the raw data is continuously expressed when the raw data subset is expressed as a graph.

That is, when each of the raw data included in the raw data subset is expressed in the coordinate space, the continuous points form a continuous section. When the plurality of continuous sections is included in the raw data subset, each of the continuous section may be discontinuous with respect to each other.

As illustrated in FIG. 5, when the raw data subset is expressed in a graph, the plurality of continuous sections W may be presented.

FIG. 5 illustrates the case where when the raw data included in one raw data subset is two-dimensionally expressed, the graphs have the form of a step function. As illustrated in FIG. 5, in this case, the plurality of continuous sections W may be presented. The plurality of continuous sections W may be discontinuous with respect to each other. That is, one continuous section W may be discontinuous with respect to another continuous section W at the start point and the end point of one continuous section W.

The processor 110 according to the present disclosure may determine a plurality of serialization points in order to generate serialized training data in the case where the plurality of continuous sections is included in the raw data subset.

Hereinafter, for convenience of the description, in the case where the raw data subset is two-dimensionally expressible, an example of the method of determining a serialization point by the processor 110 will be described.

Referring to FIG. 5, the processor 110 may determine a first serialization interval V and a second serialization interval H for a predetermined continuous section. The processor 110 may determine a point which is spaced apart from the start point of the continuous section by the first serialization interval V in a time axis direction and is spaced apart from the start point of the continuous section by the second serialization interval H in a direction of an axis of the factor to be controlled as a serialization point 200.

In this case, the first serialization interval V and the second serialization interval H may be determined based on a length of the continuous section W. For example, the first serialization interval V and the second serialization interval H may be determined with a predetermined ratio of the length of the continuous section W. Further, the first serialization interval V may be the same as or different from the second serialization interval H. Further, the first serialization interval V and the second serialization interval H may be different from each other for the serialization point corresponding to the start point of the continuous section and the serialization point corresponding to the end point of the continuous section.

For convenience of the description, the method is described based on the case where the raw data is the two-dimensional vector (the number of factors to be controlled is one), but even when the raw data is the vector exceeding two dimensions, the serialization point may be determined as described above. Accordingly, the method of determining the serialization point should not be limited to the foregoing contents.

The serialization interval according to the present disclosure may mean the interval determined with respect to the axis of one direction in the coordinate space in which the raw data is expressed in order to determine the serialization point. As described above, the serialization interval may be determined by using the distance of the continuous section W.

The serialization intervals V and H may be hyper parameters of the environmental factor control automation model according to the present disclosure.

The serialization interval may exist as much as the number of dimensions of the vector in which the raw data is expressed. Accordingly, it is not that the determination of the serialization point is possible only in the two-dimensional space as illustrated in FIG. 5.

The serialization point 200 according to the present disclosure may exceed two within one continuous section.

In particular, the processor 110 may separate one continuous section into two or more subsections in order to generate the serialization points exceeding two.

The processor 110 may determine a start point and an end point for each of the subsection, and determine a serialization point for each of the subsection based on a length of the subsection, and the start point and the end point of the subsection.

In this case, the lengths of the plurality of subsections separated from one continuous section may be different from each other.

When the continuous section is separated into the plurality of subsections, more serialization points may be generated. Accordingly, more various types of training data may be generated. Through this, the environmental factor control automation model according to the present disclosure may be more efficiently trained.

In the present disclosure, the environment may mean an environment in experiments, processes, storage, and the like that are continuously performed for a certain period of time. That is, in the example, the environment may be a laboratory in which an experiment is conducted, a medium, a sealed space, a freezer that stores arbitrary items, and a furnace in a steel mill, and the like.

In this case, the factor to be controlled in the apparatus and the method according to the present disclosure may be an RPM of an experimental apparatus, or airflow of a freezer, a furnace, and the like, which are controlled based on temperature, humidity, and the like of an experimental space, a freezer, the furnace, and the like.

The foregoing content is merely illustrative for helping understanding of the object to be controlled of the apparatus and the method according to the present disclosure, so that the type of factor to be controlled should not be limited thereto.

Figure 6A:
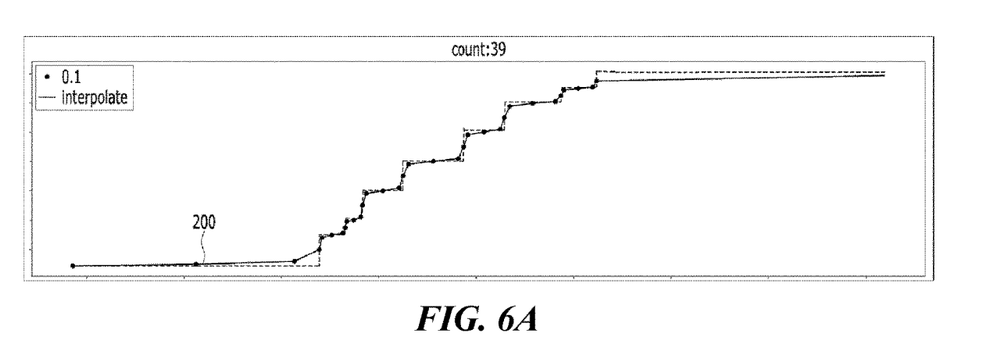
FIGS. 6A and 6B are diagrams illustrating an example of training data on which interpolation is performed by the processor according to the present disclosure.
Figure 6B:
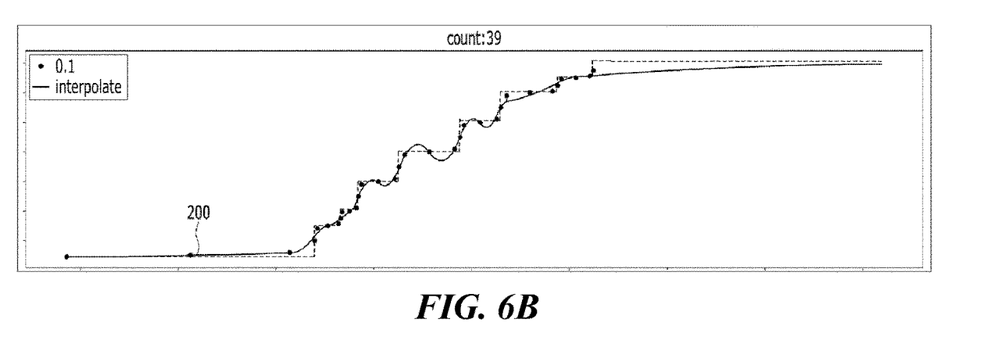

FIGS. 6A and 6B are diagrams illustrating an example of training data on which interpolation is performed by the processor according to the present disclosure.

The interpolation method is the method of constructing a new data point within an isolated point of a known data point.

In engineering and science, there may be numerous data points, which may be obtained through sampling and experiments, and through this, a function value for the limited number of values of an independent variable is expressed.

Accordingly, in the present disclosure, the processor 110 may generate data points connecting the determined serialization points by using the interpolation method.

The linear interpolation method is the method of linearly calculating according to the straight distance in order to estimate a value located between values of the end points when the values of the end points are given.

In the present disclosure, the spline interpolation method may mean the method of dividing an entire section into subsections to obtain a smooth function with low-order polynomial fragments.

When the interpolation method is used like the method according to the present disclosure, the serialized training data may be generated by using the small amount of computation. Accordingly, the total amount of computation for training the neural network according to the present disclosure may be decreased.

The processor 110 according to the present disclosure may determine a serialization point in order to connect the plurality of continuous sections when the raw data subset includes the plurality of continuous sections.

Hereinafter, for convenience of the description, in the case where the raw data subset is two-dimensionally expressible, an example of the method of determining a serialization point by the processor 110 will be described.

Referring to FIG. 5, the processor 110 may determine a first serialization interval V and a second serialization interval H for a predetermined continuous section. The processor 110 may determine a point which is spaced apart from the start point of the continuous section by the first serialization interval V in a time axis direction and is spaced apart from the start point of the continuous section by the second serialization interval H in a direction of an axis of the factor to be controlled as a serialization point 200.

In this case, the first serialization interval V and the second serialization interval H may be determined based on a length of the continuous section W. For example, the first serialization interval V and the second serialization interval H may be determined with a predetermined ratio of the length of the continuous section W. Further, the first serialization interval V may be the same as or different from the second serialization interval H. Further, the first serialization interval V and the second serialization interval H may be different from each other for the serialization point corresponding to the start point of the continuous section and the serialization point corresponding to the end point of the continuous section.

For convenience of the description, the method is described based on the case where the raw data is the two-dimensional vector (the number of factors to be controlled is one), but even when the raw data is the vector exceeding two dimensions, the serialization point may be determined as described above. Accordingly, the method of determining the serialization point should not be limited to the foregoing contents.

As illustrated in FIG. 6A and FIG. 6B, the processor 110 may connect the determined serialization points 200.

For example, the processor 110 may connect the plurality of serialization points by using the linear interpolation method. That is, the processor 110 may generate the point connecting the plurality of serialization points through the linear interpolation method.

For another example, the processor may connect the plurality of serialization points in a curve form as illustrated in FIG. 6B. In this case, the processor 110 may connect the plurality of serialization points with polynomials of a second order or higher by using the spline interpolation method. Through this, the serialized training data in the curve form may be generated.

By generating the training data by interpolating the serialization points by various methods, in addition to the linear interpolation method, more various forms of training data may be generated. Through this, the environmental factor control automation model according to the present disclosure may be more efficiently trained.

Figure 7:
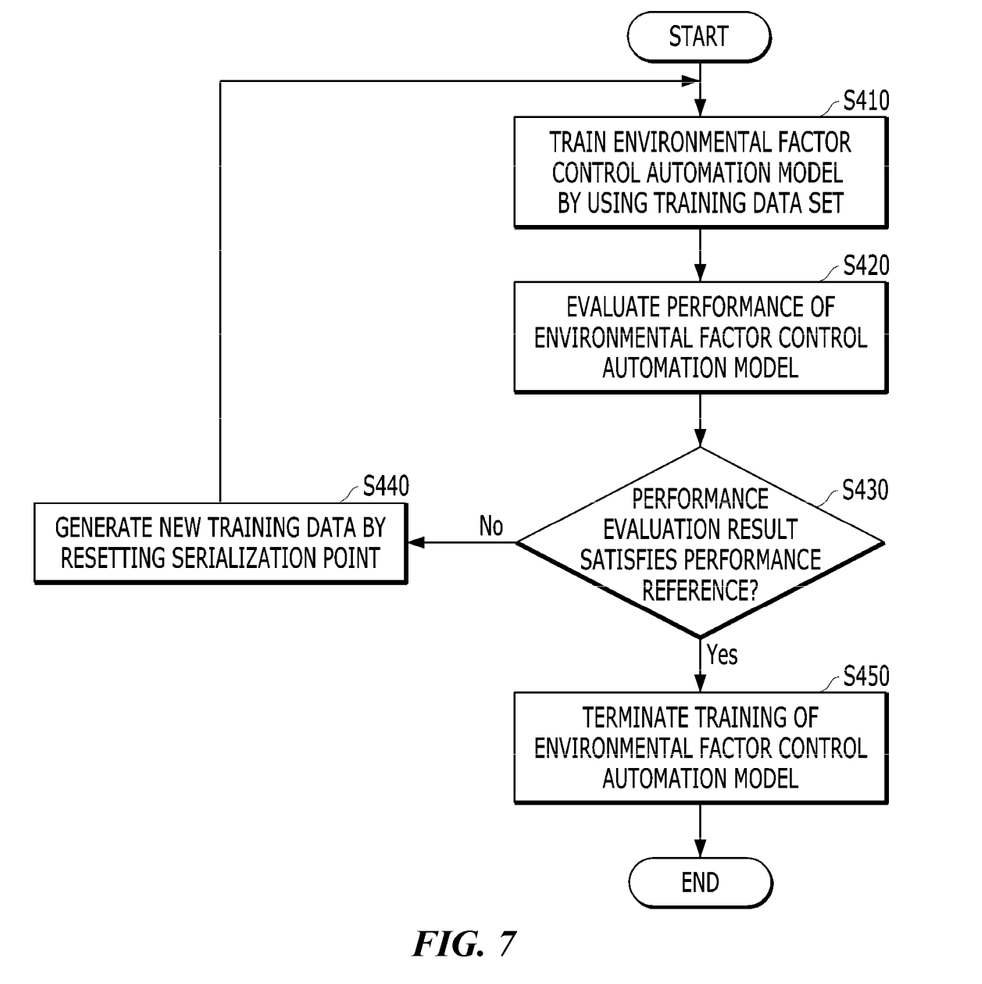
FIG. 7 is a flowchart illustrating an example of a method of generating the environmental factor control automation model by the processor according to the present disclosure.

FIG. 7 is a flowchart illustrating an example of a method of generating the environmental factor control automation model by the processor according to the present disclosure.

Referring to FIG. 7, the processor 110 may train the environmental factor control automation model by using the serialized training data (S410).

The environmental factor control automation model according to the present disclosure may be trained to receive a vector expressing an environmental factor and output an appropriate numerical value of the factor to be controlled. Particularly, when the environmental factor control automation model uses the RNN, the processor 110 may train the environmental factor control automation model so that the environmental factor control automation model receives raw data for an environmental factor up to a previous time point and determine a numerical value of a factor to be controlled at a current time point.

For example, it is assumed that the environmental factor control apparatus according to the present disclosure is for the purpose of controlling an environmental factor of a microorganism cultivation apparatus. In this case, the processor 110 may train the RNN so that the RNN receives a sequence of input data X of the microorganism cultivation apparatus from a first time point to a (T-1) time point and determine output data of the microorganism cultivation apparatus at a T time point. As described above, the environmental factor to be controlled herein may be the RPM of the experimental apparatus, and thus, the output data may also represent the RPM of the experimental apparatus. However, the output data is merely an example, and the output data should not be limited thereto.

The processor 110 may evaluate performance of the trained environmental factor control automation model (S420).

The processor 110 may evaluate prediction performance for a verification data set and a test data set by using the trained environmental factor control automation model.

In particular, the verification data set may include a verification data subset including the plurality of verification data and the test data set may include a test data subset including the plurality of test data.

The verification data and the test data provided for evaluating the prediction performance may be the data serialized by the method suggested in FIGS. 3 to 6.

In this case, the processor 110 may change the control factor according to time through the environmental factor control automation model according to the present disclosure for the verification data set and the test data set.

The processor 110 may evaluate the performance of the environmental factor control automation model by comparing values of the environmental factors according to time generated through the model with values of the control factors included in the verification data set and the test data set.

For example, the processor 110 may evaluate the performance of the environmental factor control automation model based on a value of a Mean Square Error (MSE) for the verification data set.

The processor 110 may generate the plurality of serialized training data having different serialization intervals. In this case, the processor 110 may determine the serialization interval used for generating the serialized training data having the lowest MSE value as a hyper parameter of the environmental factor control automation model according to the present disclosure.

The processor 110 may determine whether a result of the performance evaluation satisfies a performance reference, and when the result of the performance evaluation satisfies the performance reference (S430, YES), the processor 110 may terminate the training of the environmental factor control automation model (S450).

When the result of the performance evaluation does not satisfy the performance reference, the processor 110 may reset the serialization point and generate new training data (S440).

The processor 110 may evaluate performance of the environmental factor control automation model by recognizing whether the MSE value of the selected serialized training data is equal to or lower than a predetermined reference.

When the MSE value is equal to or lower than the predetermined reference, the processor 110 may terminate the training of the environmental factor control automation model.

When the result of the performance evaluation does not satisfy the performance reference, the processor 110 may reset the serialization point. In order to reset the serialization point, the processor 110 may determine a new serialization interval that is not previously used.

Figure 8:
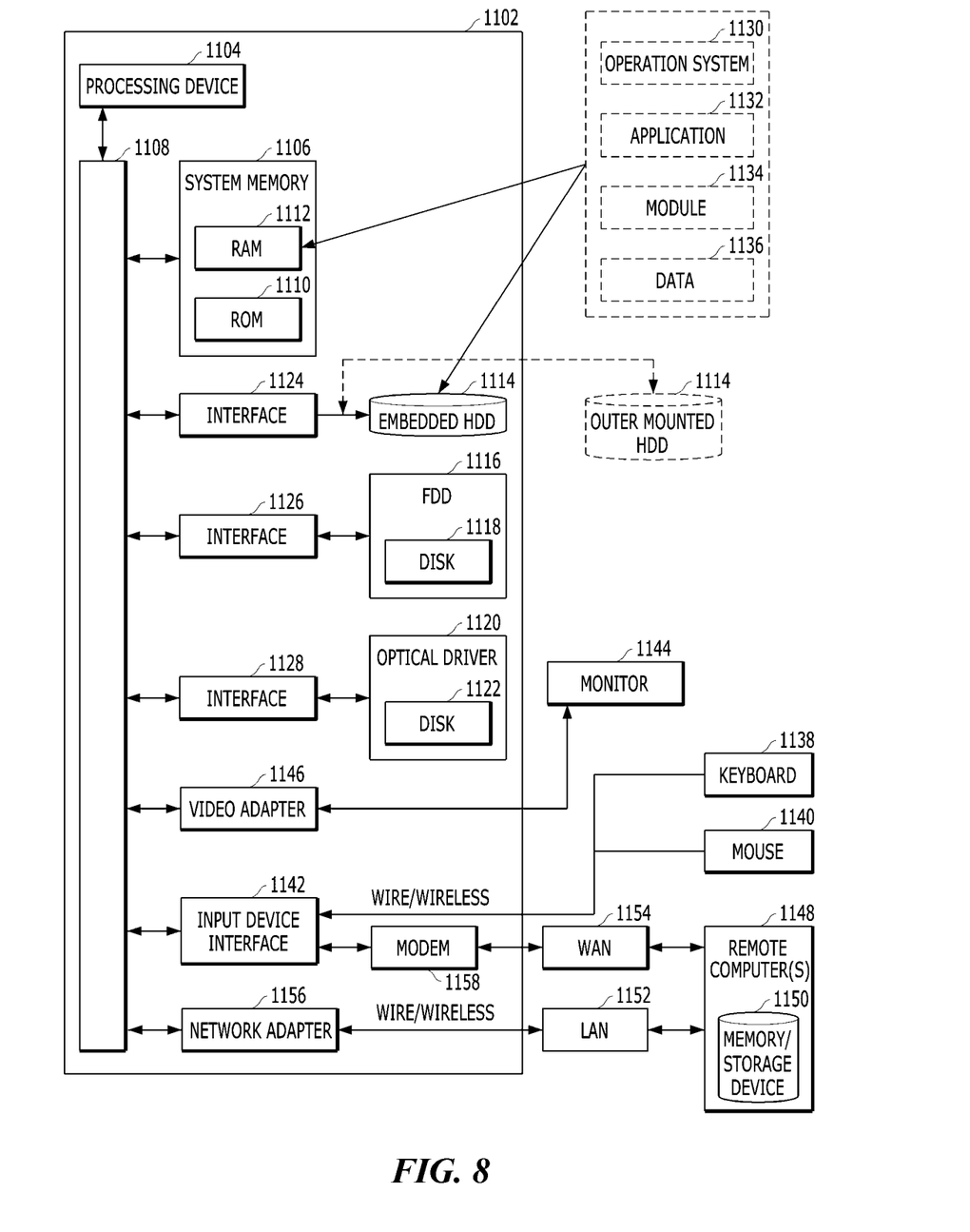
FIG. 8 is a simple and general schematic diagram for an example of a computing environment in which embodiments of the present disclosure are implementable.

FIG. 8 is a simple and general schematic diagram for an example of a computing environment in which embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data.

The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

As the described above, the relevant contents are described in the best mode for implementing the present disclosure.

The present disclosure relates to an apparatus for controlling an environmental factor by using a computer device, and a training method thereof, and more particularly, to a method of transforming training data having a discontinuous form to a continuous form.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer readable medium storing a computer program, wherein the computer program includes instructions to perform following steps for data processing when the computer program is executed by one or more processors, the steps comprising:
   recognizing at least one continuous section from each raw data subset;
   determining at least one serialization point, based on a start point and an end point of each of the at least one continuous section for each of the raw data subset; and
   generating training data by generating serialized training data, based on the at least one serialization point.

2. The non-transitory computer readable medium according to claim 1, wherein the raw data subset is in a form of a step function.

3. The non-transitory computer readable medium according to claim 1, wherein the serialization point is determined based on a start point and an end point of the continuous section and a predetermined ratio of length of the continuous section.

4. The non-transitory computer readable medium according to claim 3, wherein the predetermined ratio differs depending on a type of the raw data.

5. The non-transitory computer readable medium according to claim 3, wherein the serialization point exceeds two within the continuous section.

6. The non-transitory computer readable medium according to claim 5, wherein the serialization point is determined based on a start point and an end point of two or more subsections for each of the two or more subsections separating the continuous section.

7. The non-transitory computer readable medium according to claim 6, wherein each of the two or more subsections is different in length.

8. The non-transitory computer readable medium according to claim 1, wherein the generating of serialized training data is comprised of:
   determining a plurality of points connecting the at least one serialization point through an interpolation method.

9. The non-transitory computer readable medium according to claim 8, wherein the plurality of points is determined by interpolating with a linear functional or a multi-order function.

10. The non-transitory computer readable medium according to claim 9, wherein the interpolation method is at least one of a linear interpolation or a spline interpolation.

11. The non-transitory computer readable medium according to claim 1, further comprising:
   training an environmental factor control automation model by using the training data set;
   evaluating performance of the environmental factor control automation model; and
   determining whether to generate a new training data set by resetting the serialization point, based on a result of performance evaluating.

12. The non-transitory computer readable medium according to claim 11, wherein the performance is measured based on Mean Square Error (MSE) of Validation data set.

13. An apparatus for environmental factor control automation, comprising:
   a memory; and
   a processor;
   wherein the processor is configured to:
      recognize at least one continuous section from each raw data subset;
      determine at least one serialization point, based on a start point and an end point of each of the at least one continuous section for each of the raw data subset; and
      generate training data by generating serialized training data, based on the at least one serialization point.

14. A non-transitory computer-readable medium storing data structure corresponding to a parameter of neural network where at least a part is updated during a training process, wherein an operation of the neural network is based on at least a part of the parameter, the training process comprising:
   recognizing at least one continuous section from each raw data subset;
   determining at least one serialization point, based on a start point and an end point of each of the at least one continuous section for each of the raw data subset; and
   generating training data by generating serialized training data, based on the at least one serialization point.

* * * * *